(12) United States Patent
Walding, Jr. et al.

(10) Patent No.: US 8,015,020 B2
(45) Date of Patent: Sep. 6, 2011

(54) METER REGISTER WITH WATER VAPOR SEAL

(75) Inventors: H. Paul Walding, Jr., Slinger, WI (US); John E. Laubach, Whitefish Bay, WI (US); Andrew J. Paese, Plymouth, WI (US)

(73) Assignee: Badger Meter, Inc., Milwaukee, WI (US)

( * ) Notice: Subject to any disclaimer, the term of this patent is extended or adjusted under 35 U.S.C. 154(b) by 1732 days.

(21) Appl. No.: 11/139,215

(22) Filed: May 27, 2005

(65) Prior Publication Data
US 2005/0230040 A1     Oct. 20, 2005

Related U.S. Application Data

(62) Division of application No. 10/216,482, filed on Aug. 8, 2002, now Pat. No. 6,928,728.

(51) Int. Cl.
*G01F 15/04*     (2006.01)
(52) U.S. Cl. .............. 705/1.1; 174/50; 73/431; 524/274
(58) Field of Classification Search .............. 174/50; 524/274; 73/431; 362/267; 280/93.512; 307/116; 359/808; 705/1.1
See application file for complete search history.

(56) References Cited

U.S. PATENT DOCUMENTS

| | | | | |
|---|---|---|---|---|
| 4,900,770 A | * | 2/1990 | Tomita et al. | 524/274 |
| 5,079,953 A | * | 1/1992 | Martin et al. | 73/718 |
| 5,180,219 A | * | 1/1993 | Geddie | 362/546 |
| 5,274,502 A | * | 12/1993 | Demerritt et al. | 359/642 |
| 5,365,785 A | * | 11/1994 | Martin | 73/431 |
| 6,502,839 B1 | * | 1/2003 | Chino et al. | 280/93.512 |

\* cited by examiner

*Primary Examiner* — Jamisue A Plucinski
*Assistant Examiner* — Kimberly Evans
(74) *Attorney, Agent, or Firm* — Boyle Fredrickson, S.C.

(57) ABSTRACT

A method and article of manufacture for providing a mechanical bond and an improved water vapor seal between a lens (11, 41) and a base (17, 47) in an instrument housing (10, 40), includes heating the components and a hot butyl rubber sealant (18, 58) prior to assembly, maintaining a level of heating for the assembly during assembly, dispensing the heated sealant (18, 58) into a channel (25, 65) to form a ring-shaped body of sealant (18, 58), assembling the lens (11, 41) to the base (17, 47) and pressing a lower edge (11a, 41a) of the lens (11, 41) into the ring of sealant (18, 58) and bending an upper edge (17b, 47b) of the side wall (17a, 47a) over a portion (11b, 41b) of the lens (11, 41). The method is applied in a second embodiment to an instrument having at least two signal conductors (55) entering the base (47) at two entry points. Apparatuses manufactured with the method are also disclosed.

6 Claims, 6 Drawing Sheets

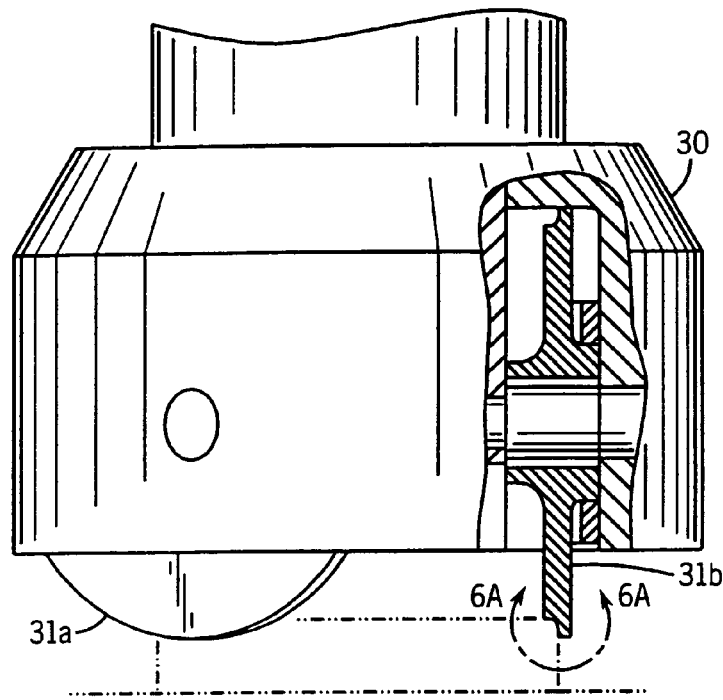
FIG. 6
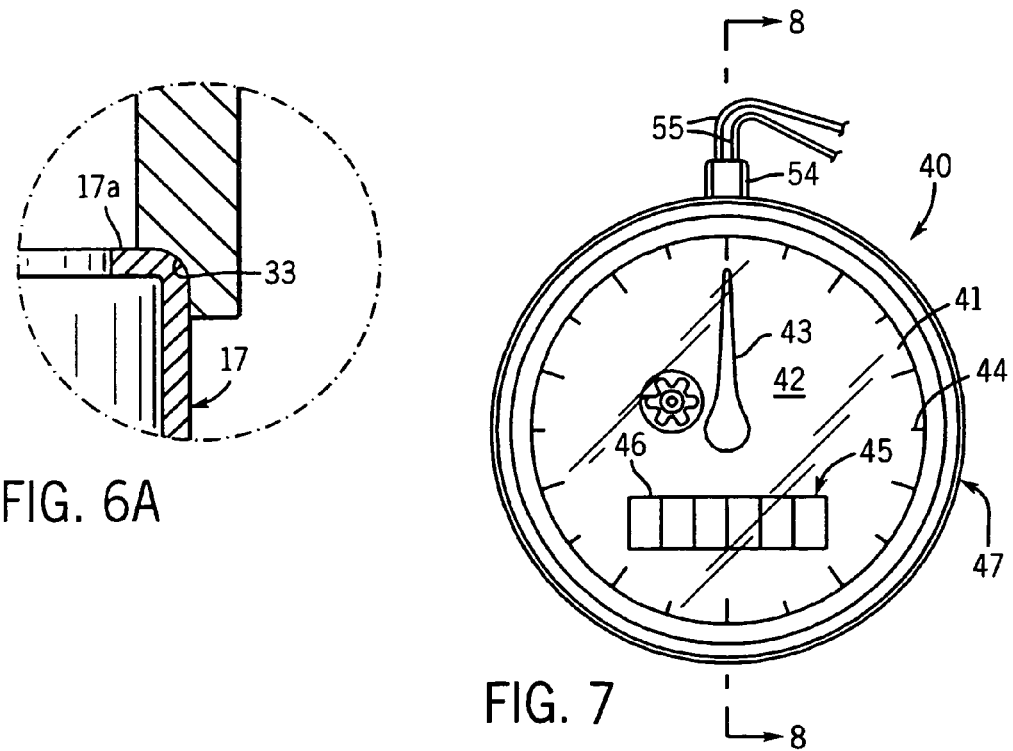
FIG. 6A
FIG. 7

METER REGISTER WITH WATER VAPOR SEAL

CROSS-REFERENCE TO RELATED APPLICATION

This is a divisional of U.S. patent application Ser. No. 10/216,482, filed Aug. 8, 2002, now U.S. Pat. No. 6,928,728.

TECHNICAL FIELD

The present invention relates to utility meter registers used in moist environments.

DESCRIPTION OF THE BACKGROUND ART

In the field of utility metering, the actual metering device (the "meter") is a different mechanism than the counting and display device which shows a total to the user or customer. This counting and display device is called a "meter register." Traditionally, these meter registers have been mechanical devices, with a tabulating mechanism and with a dial or an odometer for displaying units of consumption for a utility, such as water, electric or gas. The meter register is mounted on or in close proximity to the meter to provide a local display of a consumption total.

Today, there are at least two types of water meter registers, a basic stand-alone type that is designed to be viewed directly, and a pulse-generating type, which in addition to providing a local visual display, also transmits pulses representing units of consumption to other remote displays and to data collection and monitoring devices.

In the basic type of meter register, an ethylene propylene gasket is assembled between a glass portion and a metal base portion to form a seal. In Walding et al., U.S. Pat. No. 5,734,103, an improvement is disclosed for the pulse-type meter register which uses an epoxy-based adhesive to join a glass lens portion to a metal base portion. The pulse-type register includes wires which exit the unit for connection to a remote display or monitoring unit, whereas the basic register does not include such wires and presents a simpler case for sealing.

In the southern United States, utility meters are often located outside of residential buildings, sometimes in subsurface enclosures. During rainy periods, these units may be subjected to extreme moisture conditions, and even submersion under water. There remains a need to provide a suitable seal in these conditions, such as offered by the epoxy sealing system described above, but at a lower cost of manufacture.

Therefore, there remains a need for better sealing methods and structures for meter registers and better methods of manufacture and assembly of these units.

SUMMARY OF THE INVENTION

The invention is incorporated in an instrument assembly comprising a base and a lens which is at least transparent in part, to enclose an instrument works, while allowing a view to the interior. An annular body forms a seal between the base and lens. The sealant is flowed into position in a channel formed by the base around the perimeter of the instrument works. The lens has a lower edge pressed into the body of sealant, which is a hot melt butyl rubber that has been cured within the channel.

The flowed body of butyl rubber has been found to provide a better vapor seal than the gasket and a lower cost of manufacture than the epoxy-based system of the prior art.

The invention is further practiced in a method of providing a water vapor seal and mechanical bond between a lens and a base comprising: heating the lens and the base to at least approximately 180 degrees F.; heating an instrument works to a temperature of at least approximately 140 degrees F.; assembling the instrument works and the base, such that a groove is formed around the instrument works; maintaining a level of heating for the assembly of the instrument works and the base, such that the base is at a temperature of at least approximately 250 degrees F. in the channel; dispensing a heated body of sealant into the channel to form a ring of sealant; assembling the lens to the base and pressing a lower edge of the lens into the ring of sealant; and allowing the sealant to cure.

In contrast to the prior art, the above method provides for preliminary heating of the components to provide better results in forming the lens-to-base seal.

As a further aspect of the invention, it is advantageous to bend over a portion of an edge of the base to form a lip which helps hold the sealant in place and helps hold the assembly together.

The invention can be applied to a local utility meter register and to a pulse-generating meter register in which at least two signal conductors penetrate the housing. In the second case, an overlap point for the bead of sealant is spaced from the entry points to isolate possible causes of leakage.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

BRIEF DESCRIPTION OF THE DRAWINGS

FIG. 4b is a sectional detail view taken in the same plane as FIG. 4a;

FIG. 6 is a side view in elevation of the forming head of FIG. 5;

FIG. 6a is a detail sectional view taken in the location indicated by line 6a-6a in FIG. 6;

FIG. 7 is a second embodiment of a meter register of the present invention;

DETAILED DESCRIPTION OF THE PREFERRED EMBODIMENTS

Figure 1:
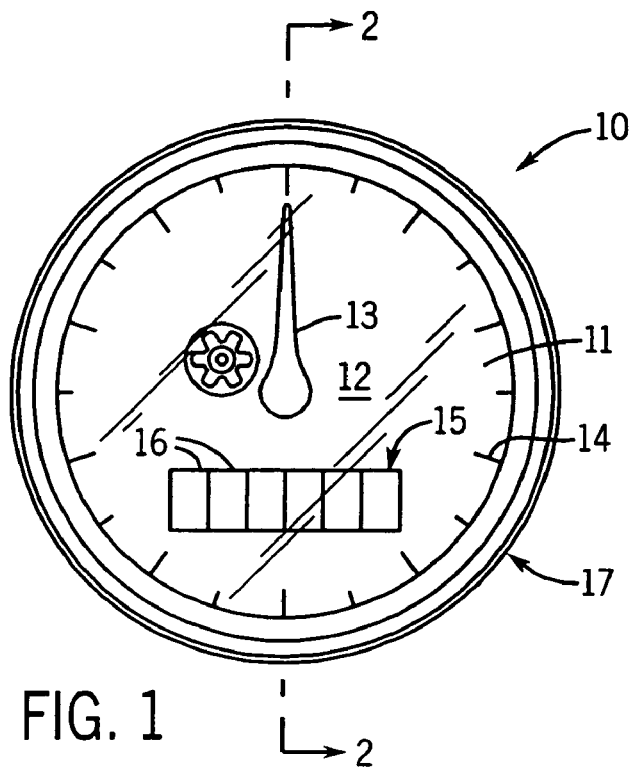
FIG. 1 is a top plan view of a basic meter register incorporating the present invention.

FIG. 1 illustrates a first embodiment of a local meter register assembly 10 that incorporates the present invention. The device is called "local" because it provides a view of consumption units only at the location of the device. The register 10 includes a transparent, dome-shaped lens 11 for viewing an instrument face 12. Preferably this lens is made of glass, but plastic and other materials could be used as long as a transparent portion or window is provided. A dial hand 13 is pivotally connected at the center of the instrument face 12, and indicia 14 are provided around a periphery of the instrument face 12. An odometer 15 is positioned below the dial pivot point. The odometer 15 includes a plurality of number wheels 16 for respective digits. The odometer 15 is viewed through an aperture 28 in the instrument face 12 as seen best in FIG. 2.

Figure 2:
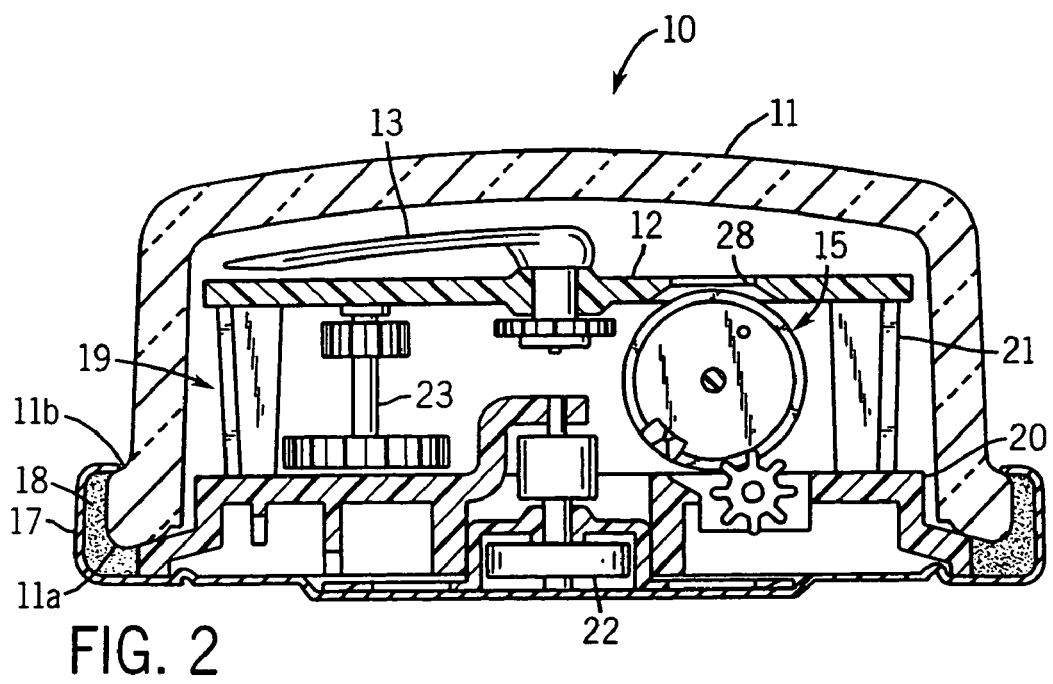
FIG. 2 is a longitudinal section view taken in the plane indicated by line 2-2 in FIG. 1.

FIG. 2 illustrates that the lens 11 is joined to a base 17 by a body of sealant 18 to form an enclosure for the assembly 10. The base is made of metal, with materials such as copper, a brass or a copper alloy being preferred, but other metals, such as tin alloys or aluminum alloys could be used and other materials such as resinous synthetic materials, glass or ceramics could be used. Inside the enclosure formed by the lens 11 and the base 17 is an instrument works assembly 19, which is supported by a plastic base 20 and a chassis 21. The instrument works 19 provides a mechanical counting mechanism. Also seen is a magnetic pickup wheel 22 which rotates in response to movement of a water turbine in a meter housing (not shown). The rotations are coupled through a mechanical drive train 23 in the instruments works 19 to drive the dial hand 13 and the odometer 15.

The sealant 18 (FIG. 2) to be used for providing a seal between the glass lens 11 and the metal base 17 is a butyl rubber sealant, such as Delchem D-2000. This sealant has an approximate viscosity of 300,000 Centipoise (CPS) at 400 degrees F. The sealant is thick and sticky, thicker than peanut butter at room temperature. The metal base 17 is made of "red brass" which has a relatively high copper content. A base 17 of this material has a tendency to draw heat out of the butyl rubber after it is applied to the base 17. As the sealant cools, the viscosity increases, making it thicker. For proper flow, adhesion and curing, the sealant should be applied after being heated to approximately 380 degrees F.

Figure 10:
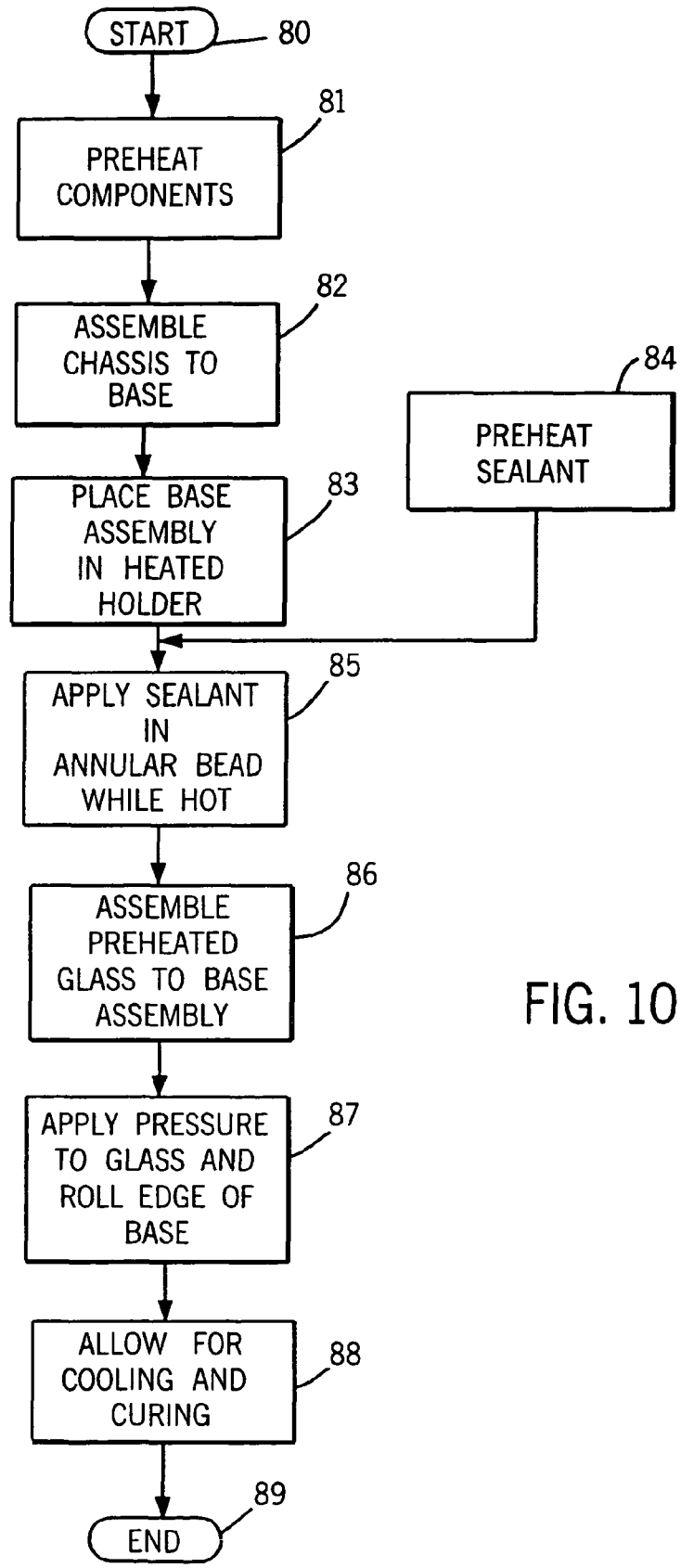
FIG. 10 is a flow chart of the manufacturing process for making the embodiments of FIGS. 1 and 7.

In assembling the meter register 10 seen in FIG. 2, there are three main subassemblies, the lens 11, the base 17 and the instrument works 19. FIG. 10 shows the steps in assembling and sealing the assembly 10. After the start of the process, represented by start block 80, the components 11, 17 and 19 are preheated, as represented by process block 81. This helps in preserving the heat of the dispensed bead of sealant 18. The dispensing equipment is also set up to transfer heat into the sealant, all the way through the system, and into a channel formed to receive the sealant.

The glass lens 11 is preheated in an oven to 300 degrees F. to get adhesion strength, to promote a homogeneous overlap point, and cause the butyl rubber to flow into a channel in the register assembly. The base 17 is preheated in the same oven as the glass to a temperature of 300 degrees F. The register works assembly 19 is preheated in a separate oven to 140 degrees F.

After preheating for a suitable time, the base 17 and register works assembly 19 are removed from the ovens, and assembled as represented by process block 82 in FIG. 10. A heated metal base 17 and a heated register works 19 are manually brought together and assembled outside of the ovens to form the assembly seen in FIGS. 3 and 4. During this time, the temperature of the base 17 may drop below 200 degrees F.

Figure 3:
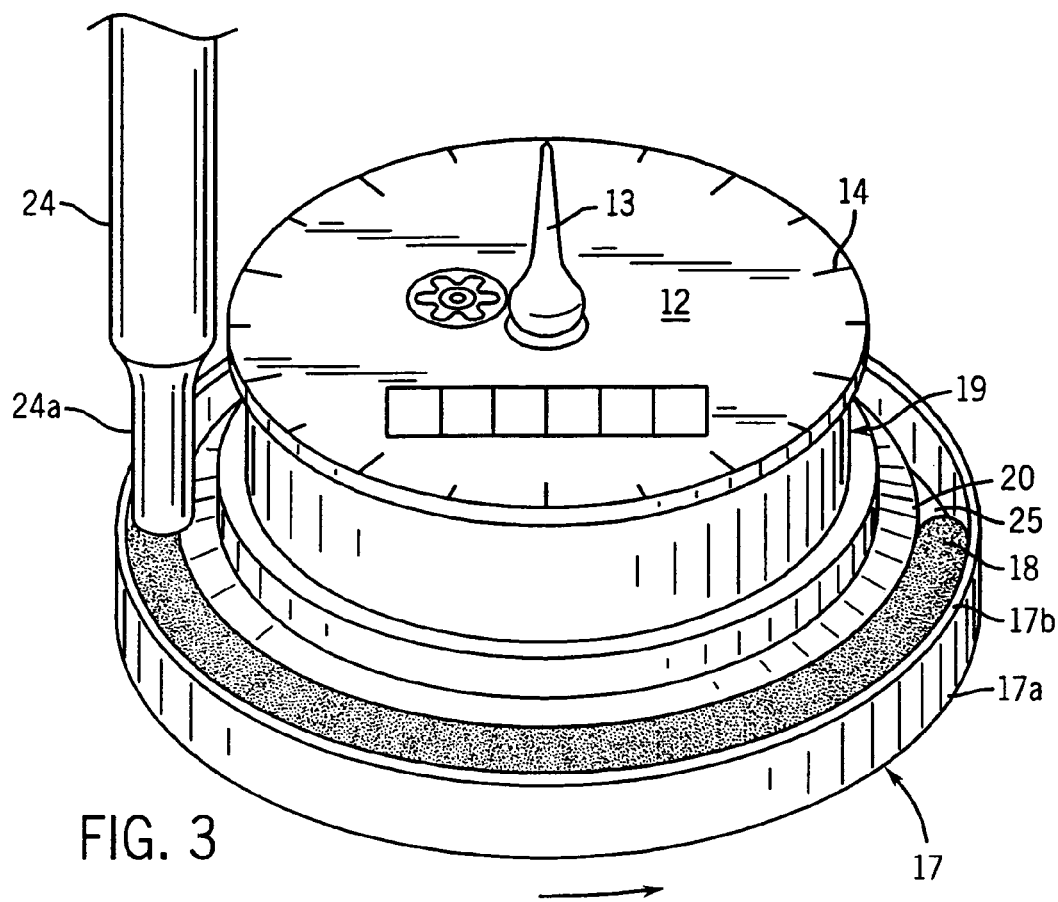
FIG. 3 is perspective view of a step in manufacturing the basic meter register of FIG. 1.
Figure 4:
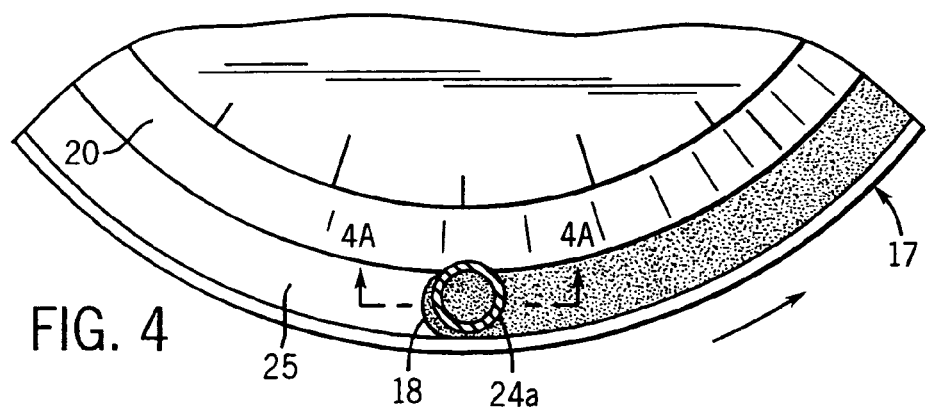
FIG. 4 is a top plan view of FIG. 3 rotated by 90 degrees.

The assembly seen in FIGS. 3 and 4 is placed in a heated holder as represented by process block 83 in FIG. 10. In the preferred embodiment, the holder is heated by induction heating. Because the works assembly 19 includes plastic parts, and heat can be transferred from the base 17 during assembly, the metal base 17 is maintained at only approximately 250 degrees F. during its time in this holder. This is sufficient to preserve the integrity of the butyl sealant, keeping it soft and pliable for the hot glass to make a homogeneous interface, particularly at the overlap point where the two ends of the bead of sealant meet.

Before dispensing a bead of sealant 18, as seen in FIGS. 3 and 4, the butyl rubber material is heated in zones to 380 degrees F. as represented by process block 84 in FIG. 10. Next, a bead of sealant 18 is applied to a channel 25 (FIG. 3) formed between the base 20 and side wall 17a, while the sealant is heated, as represented by process block 85 in FIG. 10. It should be noted that while the cross section of the channel is generally rectangular, the use of the term "channel" herein encompasses grooves and channels of various available cross sections, and is not limited to rectangular cross sections. In dispensing the bead in FIG. 3, the dispensing nozzle 24 is fixed in its position and the assembly 17, 19 is rotated (in the direction of the arrow) to create the bead 18.

The nozzle 24 utilizes a heavy-wall, high mass, beryllium copper material for maintaining the sealant 18 at the temperature of 380 degrees F. as it is laid down in a circular bead as seen in FIG. 3. The bead is dispensed into a channel 25 formed between base 20 of the instrument works 19 and a side wall 17a of the metal base 17. The sealant 18 is pumped through a nozzle 24 using a gear pump driven by a servomotor. A shot size is programmed to correspond the volume of sealant 18 necessary to make the ring-shaped bead of sealant 18. The dispensing of sealant 18 will be turned off when the nozzle 24 reaches an end point.

Figure 4A:
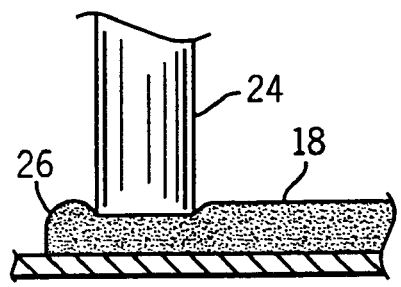
FIG. 4a is a sectional detail view taken in the plane indicated by line 4a-4a in FIG. 4.
Figure 4B:
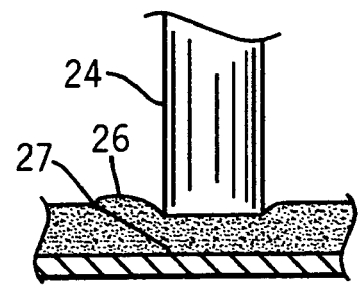

Backpressure is created by dispensing a large bead 18 with the tip 24a as close to the channel 25 as possible without bottoming the tip 24a. Clearances are held as close as 0.020 inch from tip 24a to the side wall 17a and to the edge of the base 20. Backpressure causes the dispensed bead to have a bulb 26 (FIG. 4A) that travels in front of the nozzle tip 24a as the assembly is rotated to create the bead 18. It is this bulb 26 that makes the start and stop interface overlap and a homogeneous blend of the start and stop points for the nozzle. The bulb 26 at the stop end is able to push its way under, into and over the start end 27 of the bead 18, when the bead is finished at the end of the dispensing cycle (FIG. 4B). The formation of a homogenous overlap point is critical to successful sealing.

After the sealant 18 has been dispensed into the assembly 17, 19, as a ring-shaped body, the glass lens 11 is assembled as represented by process block 86 in FIG. 10. The glass lens 11 is inserted, such that a bottom edge 11a of the glass lens 11 contacts the overlap point first. The glass lens 11 is angled into the sealant 18 at the overlap point, and then the angle is reduced to zero as the glass lens 11 is brought into contact with the body of sealant over 360 degrees. In this way, the overlap point is made homogeneous due to the heat and pressure transferred to the overlap point through the glass lens 11.

Figure 5:
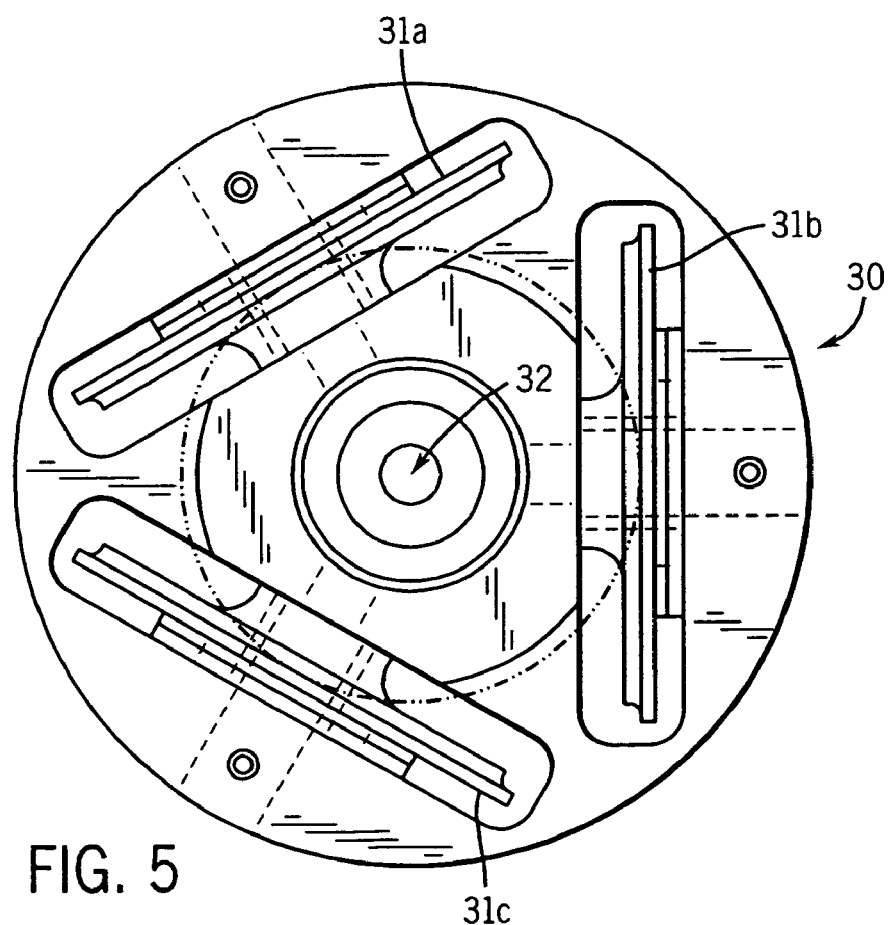
FIG. 5 is a bottom plan view of a forming head used in manufacturing the meter register of FIG. 1.

Next, as represented by process block 87 in FIG. 10, the assembly is removed from the heated fixture and placed in a forming machine. The forming machine has a rotating head 30, seen in FIGS. 5 and 6. The head 30 rotates around an axis of rotation 32 and supports three forming wheels 31a, 31b and 31c. The wheels 31a-31c each have a niche 33 that receives the top edge 17b of the side wall 17a and rolls the edge over the lip 11b of the glass lens 11 as the wheels 31a-31c roll around the top edge 17b of the base 17. During this operation, the forming head 30 also presses the glass lens 11 further into the body of sealant 18.

Next, as represented by process block 88 in FIG. 10, the assembly is removed from the forming machine and set aside for cooling. Cooling takes approximately thirty minutes. When the sealant 18 reaches room temperature, the hot melt properties of the sealant have been cured. In approximately three to five months, the reactive components of this material are fully cured by way of reactions with moisture. In three to five months, the material has reached ultimate properties and no further curing can occur. This completes the process for the local register as represented by end block 89.

Figure 8:
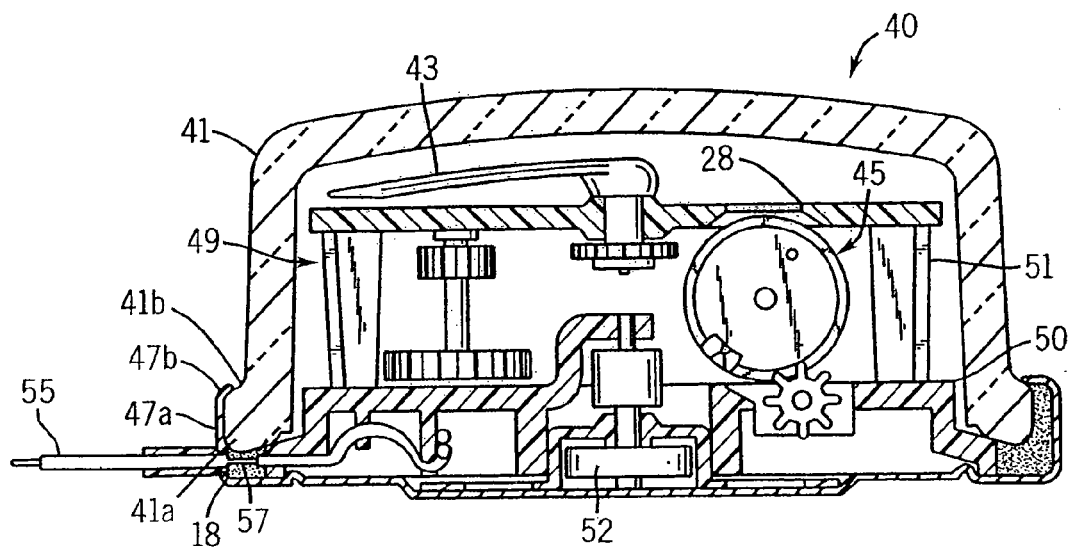
FIG. 8 is a longitudinal section view taken in the plane indicated by line 8-8 in FIG. 7.
Figure 9:
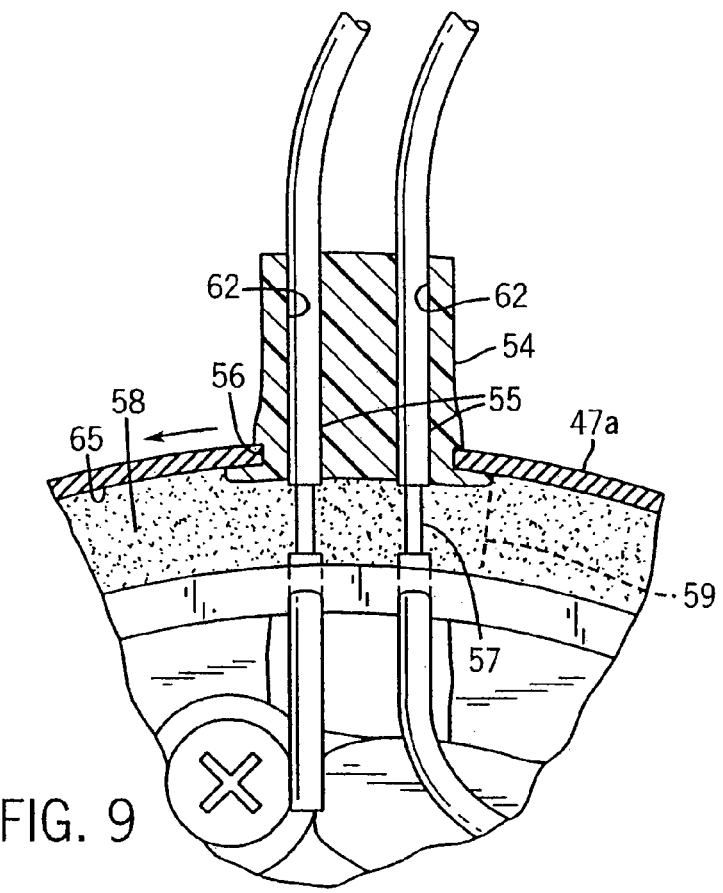
FIG. 9 is a detail sectional view from the bottom of a grommet area in the embodiment of FIG. 8.

Referring to FIGS. 7 and 8, a meter register assembly 40 of the pulse-transmitting type is shown. This register 40 has a glass lens 41, dial face 42, dial hand 43, indicia 44, odometer 45, number wheels 46, a metal base 47, an instrument works 49 and other parts similar to the local meter register 10, except for additional parts to be described. In this register 40, a magnetic pickup 52 drives a cam which operates a piezoelectric-based pulse-generating element of a type known in the art. The electrical pulses represent units of consumption. These are transmitted through two insulated wires 55 to remote displays and to remote data collection and utility usage monitoring equipment. The wires 55 have portions 57 inside the base side wall 47a (FIG. 9) which are stripped of insulation where the sealant 58 will contact them, to provide a better vapor seal around the wire entry points to the assembly 40 than would be provided by the wire insulation.

A grommet 54 (FIG. 9) supports the wires 55 as they enter the register 40. The grommet 54 has a flange and groove portion 56 for anchoring the grommet 54 in a side wall 47a of the metal base 47. The grommet 54 has holes 62 through its body from the inside to the outside of the register 40 with a spacing of at least 0.164 inches to receive the two wires 55. This spacing is greater than in the prior art and is necessary to allow enough space for the sealant 58 to flow in and around the wires 55. No other holes or vents in the grommet are necessary. The process of assembling and sealing this assembly follows the process of FIG. 10, with the following differences. Because the wires 55 must exit the assembly through side wall 47a of the base 47, the register works assembly 49, the plastic instrument base 50 and the metal register base 47 are assembled as represented by process block 82 before being heated as represented by process block 81 in FIG. 10.

Another difference is that the start point 59 for the sealant bead 58 is approximately three-eighths of an inch away from the stripped portions 57 of the wires 55. The assembly 47, 49 is rotated such that the stripped portions 57 of the wires 55 are rotated away from the stationary dispensing nozzle tip 24a (in the direction of the arrow in FIG. 9). The stripped portions 57 of the wires 55 are covered near the end of the rotation with the overlap point being reached after crossing the wires 55. This allows the base 47 to build-up heat as a result of time in the heated fixture and exposure to the hot sealant bead. This also places the overlap point at a different point than the wire entry points. This isolates the wire entry point from the overlap point so that these can be checked individually for leakage. If the bead is started and stopped over the wires, two possible leakage causes would be present in one location, which would make leakage problems more difficult to diagnose.

The heated glass lens 41 is pressed into the overlap point and wire entry points first, to create the best possible seal in those regions. Then, the glass lens 41 is angled into the remaining portion of the sealant 58, as described previously.

All other operations were the same as described previously for FIG. 10. By using a common process as described above, one dispensing machine system can accommodate two different assemblies, the local register and remote pulse-transmitter register, thus reducing set-up time, tooling and machine complexity.

This has been a description of the preferred embodiments of the invention. For embodiments falling within the spirit and scope of the present invention, reference is made to the claims which follow.

We claim:

1. A metering instrument assembly comprising:
   an instrument works;
   a lens and a base forming an enclosure for said instrument works, said enclosure having a lens-to-base vapor seal formed around said instrument works; wherein the lens-to-base vapor seal is formed by an annular body of sealant flowed into position in a channel around a perimeter of the instrument works;
   wherein the lens is made of glass and the base is made of metal; and
   wherein the base of metal will withstand temperatures to 300 degrees Fahrenheit; and
   wherein the sealant is a butyl rubber that has been cured in said channel after said lens has been pressed into said channel.

2. The metering instrument assembly of claim 1, wherein the base has a side wall that forms a lip that extends over the body of butyl rubber and completely around a peripheral edge of the base to protect the body of sealant and assist in holding the assembly together both during and after curing.

3. A metering instrument comprising:
   an instrument works;
   a lens and a base forming an enclosure for said instrument works, said enclosure having a lens-to-base vapor seal formed around said instrument works; wherein the lens-to-base vapor seal is formed by an annular body of sealant flowed into position in a channel around a perimeter of the instrument works;
   wherein the sealant is a butyl rubber that has been cured in said channel after said lens has been pressed into said channel; and
   wherein the sealant extends in a longitudinal direction around the perimeter of the instrument works and wherein at least two signal conductors extend through the ring of sealant transverse to the longitudinal direction of said sealant, and wherein said signal conductors have portions of insulation removed and are spaced at least 0.164 inches apart to allow the sealant to flow around them and settle to form a seal around the signal conductor entry points.

4. The metering instrument of claim 3, wherein an overlap point between a start end and a stop end of the sealant is spaced from said signal conductors.

5. The metering instrument assembly of claim 1, wherein the base is made of a copper alloy.

6. The metering instrument assembly of claim 2, wherein the base is made of a copper alloy.

* * * * *